(12) United States Patent  
Ogilvie

(10) Patent No.: US 6,292,224 B1  
(45) Date of Patent: Sep. 18, 2001

(54) METHOD FOR ELIMINATING DOT-CRAWL ON NTSC TELEVISION MONITORS

(75) Inventor: Brian K. Ogilvie, Medway, MA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 08/857,629

(22) Filed: May 16, 1997

(51) Int. Cl.$^7$ .................................................. H04N 9/45
(52) U.S. Cl. ................................. 348/508; 348/624
(58) Field of Search ................................ 348/488, 493, 348/607, 612, 615, 624, 630, 505–508

(56) References Cited

U.S. PATENT DOCUMENTS

| | | |
|---|---|---|
| 4,660,074 | 4/1987 | Schine . |
| 4,661,840 | 4/1987 | Phelps . |
| 4,797,731 * | 1/1989 | Dischert et al. ................... 358/17 |
| 4,833,523 | 5/1989 | Lentz . |
| 5,282,020 * | 1/1994 | Tanaka ................................ 358/17 |
| 5,459,524 * | 10/1995 | Cooper ............................. 348/508 |

OTHER PUBLICATIONS

Poynton, C., *A Technical Introduction to Digital Video*, pp. 185–192. undated.

* cited by examiner

Primary Examiner—Victor R. Kostak  
(74) Attorney, Agent, or Firm—Conley, Rose & Tayon, PC; B. Noel Kivlin

(57) ABSTRACT

An improved method for generating an NTSC compatible color television video signal having a main carrier signal and a color subcarrier signal 3,579,545 Hz above the main carrier signal. The main carrier signal is modulated by a luminance signal, while the color subcarrier is modulated in quadrature with color difference signals. The luminance and color difference signals provide 525 scan lines of picture frame information at a rate of 29.97 frames per second so that the color subcarrier has 227.5 cycles for each scan line, resulting in 119,437.5 color subcarrier cycles per frame. The additional half cycle causes a subcarrier phase inversion from frame to frame, which produces undesirable dot-crawl. The improvement comprises incrementing the phase of the color subcarrier by a fixed increment at a number of predetermined intervals in each picture frame, to produce a total phase shift which prevents the phase inversion. The total phase shift is an odd-half-multiple of a color subcarrier cycle. In one embodiment, the number of predetermined intervals is $2^N$, and the fixed increment is $180°/2^N$. If N is chosen to be 7, the 128 predetermined intervals may be chosen to be at the beginning of every fourth line, starting with scan line 7 and skipping scan lines 263 and 271.

22 Claims, 2 Drawing Sheets

METHOD FOR ELIMINATING DOT-CRAWL ON NTSC TELEVISION MONITORS

BACKGROUND OF THE INVENTION

1. Field of Invention

This invention relates to color television signal transmission, and more particularly to a method and apparatus for encoding a television signal to reduce apparent dot-crawl while maintaining compatibility with the standards of the National Television Systems Committee (NTSC).

2. Description of Related Art

The term "dot-crawl" refers to a phenomenon that occurs at a sharp vertical transition between contrasting colors in an NTSC encoded color television signal. The sharp vertical transition is rendered with a jagged edge which resembles a zipper having teeth which appear to progress (i.e. crawl) up the screen. This noticeable and undesirable effect results from the method in which color information is encoded in an NTSC color television signal.

The NTSC color system is a type of color transmission approved by the Federal Communications Commission in the United States to be compatible with pre-existing monochrome receivers. The approach used is to transmit encoded color information on a subcarrier 3.579545 MHz from the main picture carrier. The main picture carrier is modulated with a luminance signal Y which is derived from red (R), green (G), and blue (B) camera signals according to the following equation:

$$Y = 0.299R + 0.587G + 0.114B.$$

The color subcarrier is modulated with in-phase (I) and quadrature-phase (Q) signals derived from the color difference signals (R-Y) and (B-Y) according to the following equations:

$$I = 0.74(R-Y) - 0.27(B-Y)$$

$$Q = 0.48(R-Y) + 0.41(B-Y).$$

Alternatively, the I and Q signals may be directly derived from the R, G, B signals. In any case, the R, G, B signals may be recovered at the receiver from the Y, I, and Q signals.

The signals are used to create a television picture at a rate of 29.97 frames per second, with 525 lines per frame. Consequently, the signals have strong harmonic components that are spaced 15,734.264 Hz apart. To minimize interference that a monochrome receiver might experience from the signals on the color subcarrier, the subcarrier frequency was chosen to be an odd-half-multiple of 15,734.264 to cause the harmonic components of the color signals to interleave with the harmonic components of the luminance signal. The precise color subcarrier frequency is 227.5 times 15,734.264 Hz. This provides a wide frequency separation, frequency interleaving, and minimal interference with the audio signal, which is modulated on an audio subcarrier 4.5 MHz above the main picture carrier.

Since the color difference signals are communicated on a subcarrier having 227.5 cycles per line, and since the television picture frame is composed of two interleaved fields of 262.5 scan lines each, the subcarrier goes through 59,491.25 cycles during the picture scan from one line to the adjacent scan line above it, through 119,437.5 cycles during a complete scan from one line back to itself, and through 178928.75 cycles to the adjacent scan line above it again. Hence during the display of four picture fields, the phase of the subcarrier at a point on the screen progresses through a phase angle of 0, 90°, 180°, 270°, and repeats. This characteristic becomes noticeable near a sharp vertical transition between colors, which broadens the spectra of the color difference signals enough to cause interference with the luminance signal. The luminance signal is displayed having interference near sharp color transitions, with the phase of the interference cycling through 90° of phase for each field displayed. This manifests as a fine pattern of dots that apparently traverse upward along the transition at a rate of one scan line per field, about eight seconds through the height of the image.

A related phenomenon termed "hanging dots" occurs when a sharp horizontal transition between saturated colors occurs, which also broadens the color difference spectra enough to cause interference with the luminance signal. Once again, the luminance signal is displayed having interference with the phase of the interference cycling through 90° of phase for each field displayed. This time, a horizontal line of moving dots is displayed at the transition.

The sharp, contrasting color transitions are common in computer generated graphics, and are becoming more commonplace with the increase in use of computer generated graphics for television display. Dot-crawl and hanging dots are objectionable because their moving nature tends to distract the viewer from the object being displayed. It is desirable to stop the apparent motion of dot-crawl and hanging dots.

Previous patents have provided three methods for "freezing" dot-crawl by altering the signal encoding. In U.S. Pat. No. 4,660,074 issued to Jonathon M. Schine on Apr. 21, 1987, a clock divider circuit in the encoder is used to generate the horizontal synchronization signal, and once for each scan line (except the last scan line of each field) an early reset is issued to the clock divider to cause the synchronization timing of the system to drop a half of a color subcarrier cycle at the end of each scan line. In U.S. Pat. No. 4,661,840 issued to Arthur C. Phelps on Apr. 28, 1987, a clock divider circuit in the encoder is used to generate the horizontal synchronization signal, and once for each field an early reset is issued to the clock divider to cause the synchronization timing of the system to drop a quarter of a color subcarrier cycle at the end of each field. In U.S. Pat. No. 4,833,523 issued to John T. Lentz on May 23, 1989, a clock divider circuit in the encoder is used to generate the horizontal synchronization signal, and at the beginning of each frame the phase of the horizontal synchronization signal is alternately shifted forward and backward by one half of a color subcarrier cycle.

In each of these patents, the synchronization signals are shifted by a fraction of a color subcarrier cycle sufficient to cause the phase of the color subcarrier (and hence any color signal interference) to remain the same from frame to frame. This "freezes" the effective dot-crawl and hanging dot motion. The alterations of synchronization signal timing produce signals that are not truly NTSC compliant, and which may be unsuitable for some NTSC monitors and VCRs, particularly those that use comb filters to separate the luminance signal from the color signals.

One other method which has been used is to invert the color subcarrier for alternate frames. This sudden change of color subcarrier phase leads to visual artifacts such as false colors and color smearing at the top of the display, making this solution unsatisfactory as well. It is desirable to have a method for producing an NTSC compliant signal without dot-crawl and hanging dot motion to improve the display of computer generated graphics on television monitors.

SUMMARY OF THE INVENTION

The problems outlined above are in large part solved by an improved method for generating an NTSC compatible color television video signal. In one embodiment, an encoder core generates a color subcarrier having 227.5 cycles per scan line using a numerically controlled oscillator with a phase offset register for adjusting the phase of the color subcarrier. The contents of the phase offset register is incremented by small steps at the beginning of scan lines distributed evenly throughout the 525 scan lines in one picture frame. The sum of the increment steps is sufficient to cause the subcarrier to lose or gain 180° of phase during the picture frame scan, and thereby avoid having the next picture frame be scanned with the subcarrier phase inverted. Having the same initial color subcarrier phase at the beginning of each picture frame provides a constant relationship between screen position and color subcarrier phase. This constant spatial relationship effectively "freezes" dot-crawl and hanging dot motion.

Broadly speaking, the present invention contemplates a method for encoding a color television video signal. The method comprises generating a color subcarrier and incrementing a phase of the color subcarrier at a number of predetermined intervals in a picture frame. The sum of the increments at the predetermined intervals is an odd halfmultiple of a color subcarrier cycle.

The present invention further contemplates a color video encoder comprising a subcarrier phase generator, a phase offset register, a sinewave module, and an increment module. The subcarrier phase generator is configured to provide a subcarrier phase, and the phase offset register is configured to add a phase offset to the subcarrier phase to provide an adjusted subcarrier phase. The sinewave module receives the adjusted carrier phase and converts the adjusted subcarrier phase to a subcarrier signal value. The increment module adjusts the phase offset by an increment at a number of predetermined intervals in each picture frame. The sum of the increments at the predetermined intervals is an odd-half-multiple of a color subcarrier cycle.

BRIEF DESCRIPTION OF THE DRAWINGS

Other objects and advantages of the invention will become apparent upon reading the following detailed description and upon reference to the accompanying drawings in which.

Figure 1:
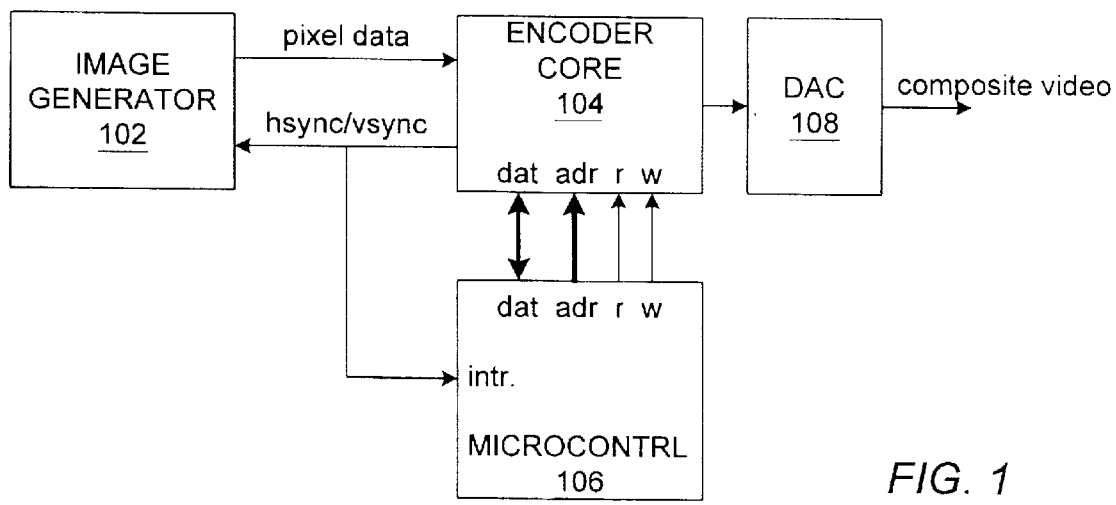
FIG. 1 is a block diagram of a NTSC video signal encoder system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 shows an improved NTSC video signal encoder which converts images to an NTSC compatible composite video signal. An image generator 102, such as a video camera, provides pixel data of the image to an encoder core 104 in response to horizontal and vertical synchronization signals from encoder core 104. The operation of encoder core 104 is managed by a microcontroller 106, and encoder core 104 produces a digital video signal which is provided to a digital-to-analog converter (DAC) 108. DAC 108 coverts the digital video signal into an analog composite video signal for modulation and transmission and/or display.

Generally speaking, the improved NTSC video signal encoder core includes a frequency generator which generates a color subcarrier at the NTSC specified 227.5 cycles per scan line. The encoder core also includes a phase offset register which is used to adjust the phase of the color subcarrier in small increments to provide a 180° phase shift during a frame scan. This advantageously provides a fixed spatial relationship between the cycles of the color subcarrier and the scan lines that does not change from frame to frame. The use of multiple small phase adjustments distributed throughout the frame provides for more accurate subcarrier phase tracking at the receiver, thereby avoiding the introduction of color smearing and other visual artifacts.

In FIG. 1, image generator 102 is typically a video camera, but may also be a computer graphics generator or a storage device having a sequence of image data. Encoder core 104 generates NTSC horizontal and vertical synchronization signals internally and provides them to image generator 102 as reference signals, as well as to microcontroller 106 as interrupt signals. Microcontroller 106 sets parameters for encoder core 104 such as specifying NTSC, PAL (Phase Alternation Line standard), or Macrovision signal encoding standards, and adjusting the relative phases of the vertical synchronization signal, the horizontal synchronization signal, and the color subcarrier. The microcontroller 106 may respond to interrupts from the encoder core to monitor and update parameter and phase values. The parameter values are monitored and set via a bus between the microcontroller 106 and the encoder core 104. The bus carries address signals and read/write signals from the microcontroller 106 to the encoder core 104. The bus also carries parameter values on data lines between the encoder core 104 and the microcontroller 106. In one embodiment, the encoder core 104 generates horizontal and vertical synchronization signals which are coupled to the microcontroller 106 interrupts. In this configuration, the microcontroller 106 reads one or more parameters (such as the color subcarrier phase offset) at the beginning of each scan line. If necessary (i.e. if the current scan line is one of a set of predetermined scan lines for which the color subcarrier phase is to be incremented), the microcontroller 106 adjusts a parameter and writes the adjusted parameter back to the encoder core 104.

Figure 2:
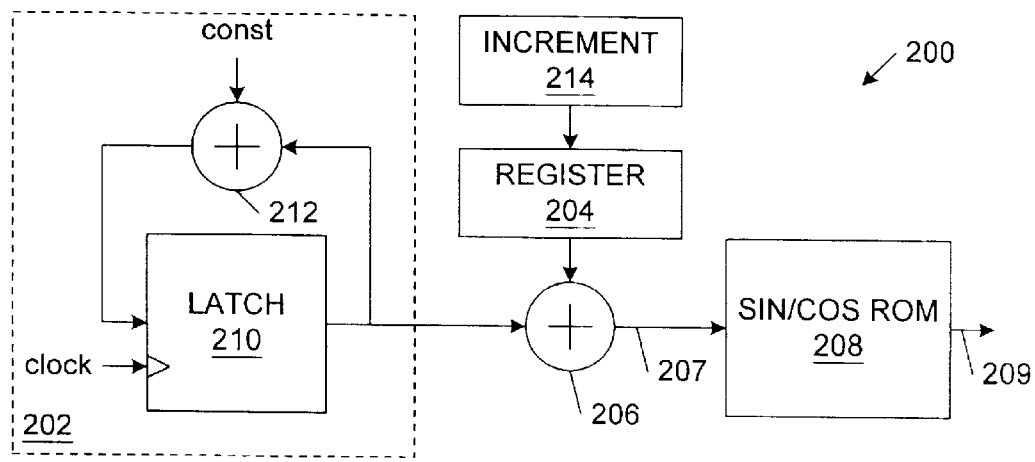
FIG. 2 is a block diagram of a first embodiment of a color subcarrier generator for use in a video signal encoder system.

In one embodiment, encoder core 104 includes a color subcarrier generator 200 as shown in FIG. 2. Color subcarrier generator 200 includes a subcarrier phase generator 202, a phase offset register 204, an adder 206, and a sinewave module 208. Subcarrier phase generator 202 is a numerically controlled oscillator (NCO) which provides a steadily progressing subcarrier phase. The subcarrier phase generator may comprise an adder 212 and a multi-bit latch 210. The adder 212 receives a current phase value from latch 210, and adds a predetermined phase increment value (labeled const in FIG. 2) to the current phase value to produce a subsequent phase value. The latch 210 is coupled to latch the subsequent phase value from the adder 212 in response to a clock signal, thereby causing the subsequent phase value to become the current phase value. As the clock signal continues to trigger the latch, the current phase value increments steadily, rolling over past zero when the adder 212 overflows.

The phase offset register 204 holds a phase offset value which is provided to adder 206 for addition to the subcarrier phase provided by subcarrier phase generator 202. The result provided by the adder 206 is the adjusted subcarrier phase 207. The adjusted subcarrier phase 207 is coupled to a sinewave module 208 (labeled SIN/COS ROM in FIG. 2). The sinewave module 208 performs the sine function on the adjusted carrier phase 207 to produce a subcarrier signal 209. The sinewave module 208 may be implemented using a look-up table in the form of a read-only memory (ROM) or other memory module. Well known techniques exist for using a sine function look-up table which covers only the first quadrant and extending the module function to cover four quadrants by using the two most significant bits of the subcarrier phase 207 to invert the output of the table and/or the rest of the input bits to the look-up table.

Figure 3:
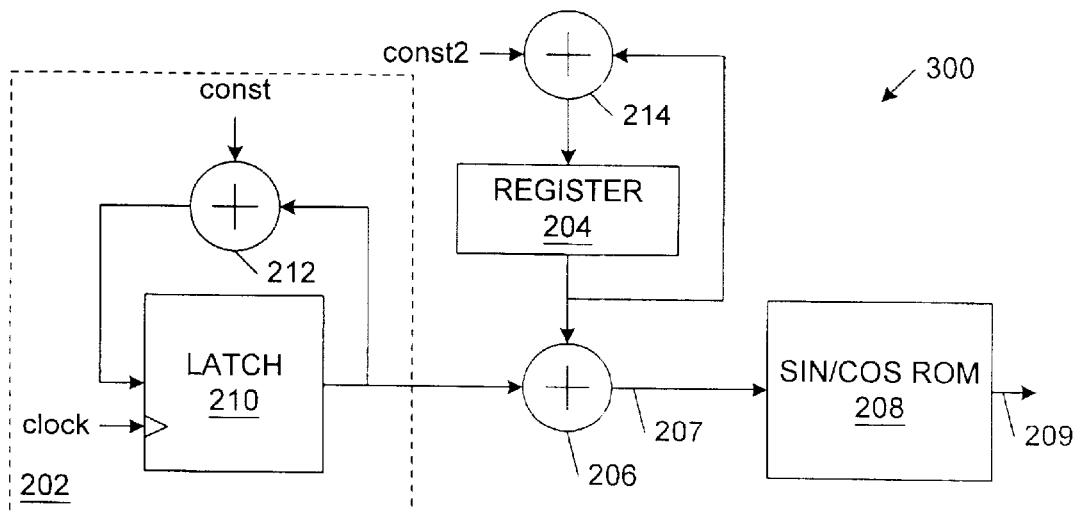
FIG. 3 is a block diagram of a second embodiment of a color subcarrier generator for use in a video signal encoder system.

The phase offset register 204 is coupled to an increment module 214 which adjusts the contents of the phase offset register 204 by an increment at predetermined intervals in each picture frame, in a manner discussed further below. In one embodiment, the functionality of this increment module 214 may be implemented by software on microcontroller 106 at the beginning of each horizontal scan line. In another embodiment (refer to color subcarrier generator 300 in FIG. 3) the increment module 214 may take the form of an adder 205 which adds a fixed increment (labeled const2 in FIG. 3) to the current phase offset to produce a subsequent phase offset. The subsequent phase offset is loaded into phase offset register 204 in response to a trigger signal that clocks the phase offset register. This trigger signal may be provided by microcontroller 106, or it may be provided by dedicated logic.

The term "odd-half-multiple" is herein used to describe a number such as 0.5 (1/2), 1.5 (3/2), or 227.5 (455/2). An odd-half-multiple is any number which can be expressed as the product of one-half and an odd integer (i.e. an odd multiple of one half).

Figure 4:
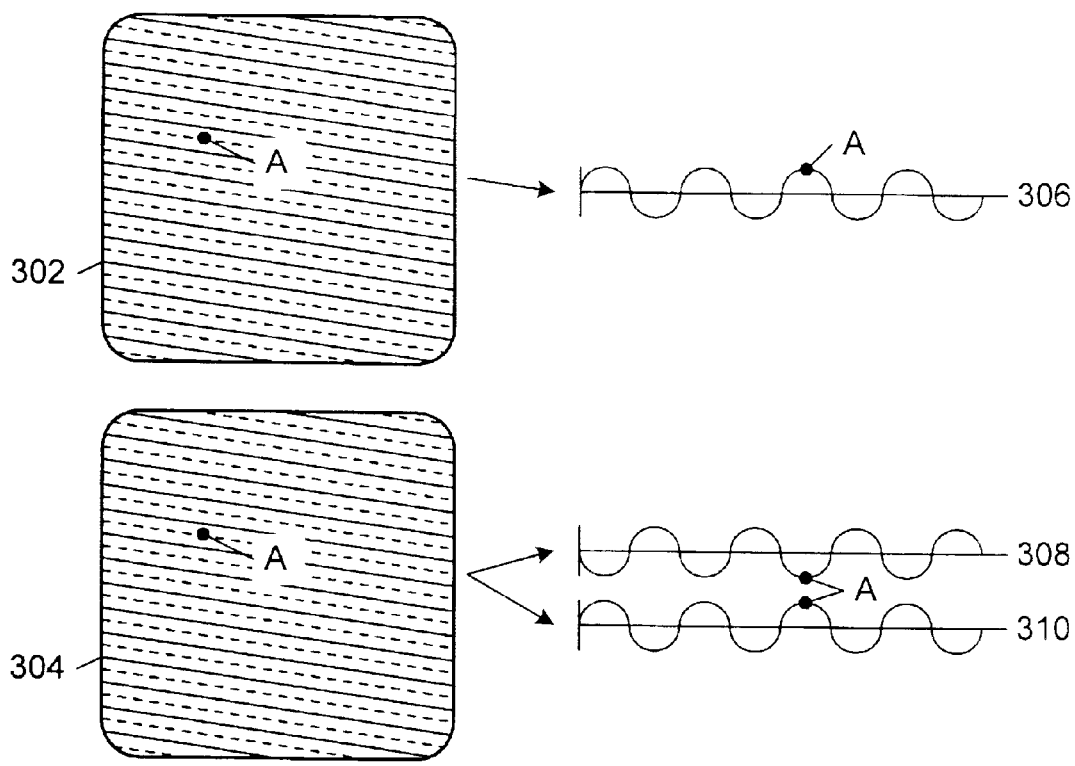
FIG. 4 is a diagram of the spatial relationship between scan lines and color subcarrier phase.

Turning now to FIG. 4, two video picture frames are shown: a current frame 302 and a subsequent frame 304. Each frame comprises two interlaced fields: a top field (dotted lines) and a bottom field (thin solid lines). The horizontal scan rate is 15,734.264 scan lines per second. The color subcarrier signal being generated by color subcarrier generator 200 is very close to 3,579,545 Hz, which is 227.5 times the horizontal line scan rate. An NTSC picture frame has 525 scan lines, and the frame rate is 29.97 frames per second. Due to the odd half multiple (227.5) of color subcarrier cycles per line and the odd number (525) of lines per frame, there is an odd half multiple of subcarrier cycles per frame, namely 119,437.5. This results in an inversion of the color subcarrier phase (and the phase of corresponding interference) between subsequent frames, which when coupled with the interlaced nature of the display fields results in dot-crawl and hanging dot motion.

FIG. 4 shows a position A on a screen. When current frame 302 is scanned across the screen, the color subcarrier has a given phase at position A. The phase of the color subcarrier for a scan line crossing position A is shown in graph 306. Before position A is crossed by the same scan line in subsequent frame 304, the color subcarrier undergoes 119,437 and one-half oscillations. Consequently, if no phase adjustments are made, the phase of the color subcarrier at position A is 180° out of phase as shown in graph 308. This variation of phase causes the apparent motion of interference caused by the color subcarrier. However, if the phase of the color subcarrier is adjusted during the intervening frame time by 180° or some odd multiple of 180°, then the phase of the color subcarrier at position A on the screen will be the same in the subsequent frame as shown in graph 310. The constant spatial relationship between screen position and color subcarrier phase effectively freezes the apparent motion of interference caused by the color subcarrier.

To prevent the inversion of the color subcarrier phase between frames, a series of adjustments are made to the color subcarrier phase to cause the phase of the color subcarrier to be the same at each point in the frame from frame to frame. This constant spatial relationship between the cycles of the color subcarrier and the frame scan lines is provided by adjusting the phase of the color subcarrier by a total of an odd half multiple of color subcarrier cycles during one frame. Note the constant relationship may achieved by adding or subtracting an odd half multiple color of subcarrier cycles from the color subcarrier phase.

Figure 5:
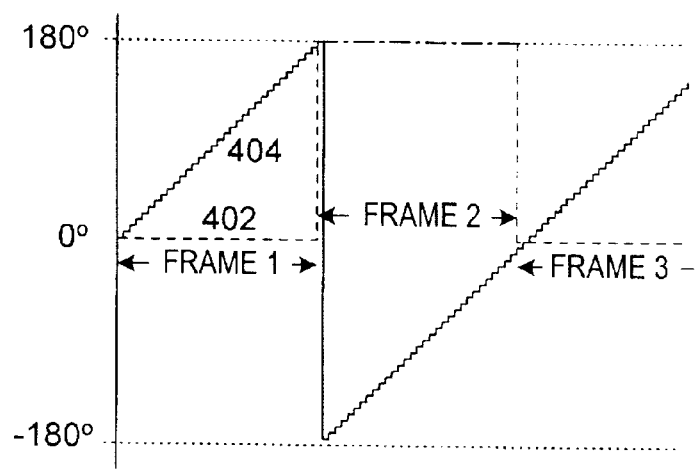
FIG. 5 is a diagram of exemplary color subcarrier phase offsets that eliminate dot crawl.

Turning to FIG. 5, adjustments to the color subcarrier phase offset to are shown as a function of time. Adjustment method 402 (dashed line) wherein the phase of the color subcarrier is simply shifted by 180° at the beginning of each frame functions to eliminate dot crawl and hanging dot motion. However, the large phase shift introduces synchronization problems at the receiving end where the phase-locked loop which regenerates the color subcarrier may be unable to track the large discontinuous jump. Adjustment method 402 may consequently produce visual artifacts such as color smearing at the beginning of the frame. A preferred adjustment method 404 adjusts the phase of the color subcarrier in a plurality of small increments, thereby simplifying the color subcarrier regeneration task at the receiving end. Note that the seemingly large jump in phase as shown is in reality no larger than the other phase increments due to the wrap-around equivalence of the phase (i.e. +180° is equal to −180°).

The phase increments may be distributed at $2^N$ predetermined intervals per frame, and the total adjustment to the phase is preferably 180° per frame. This may be achieved with a fixed increment of $180°/2^N$. In one embodiment, 128 predetermined intervals are used, with a fixed increment of 1.40625°, although smaller increments may be used at a larger number of intervals. One distribution of 128 predetermined intervals across the 525 frame scan lines is achieved by providing the increments at the beginning of every fourth scan line starting with scan line 7 and skipping lines 263 and 271, although other distributions may be chosen. As mentioned above, the increment may be provided via software on the microcontroller by interrupting the microcontroller every scan line and having the microcontroller keep a scan line count. Alternately, the increment can be accomplished by decoding the scan line numbers in hardware and doing the increment automatically. A hybrid scheme using both hardware and software would be to interrupt the processor every fourth line, and having the processor count to determine which lines to skip.

Numerous variations and modifications will become apparent to those skilled in the art once the above disclosure is fully appreciated. It is intended that the following claims be interpreted to embrace all such variations and modifications.

What is claimed is:

1. A method for encoding a color television video signal, wherein the method comprises:

generating a color subcarrier;

incrementing a phase of the color subcarrier by an increment at a number of predetermined intervals in a picture frame, wherein the number of predetermined intervals is greater than one, and wherein a sum of the increments at the predetermined intervals is an odd half-multiple of a color subcarrier cycle;

wherein the number of predetermined intervals is $2^N$, wherein N is an integer, and wherein the increment is $180°/2^N$.

2. The method of claim 1, wherein the number of predetermined intervals is 128, and wherein the increment is 1.40625°.

3. The method of claim 2, wherein the predetermined intervals are at the beginning of every fourth scan line, starting with scan line 7 and skipping scan lines 263 and 271.

4. The method of claim 1, further comprising:

counting scan lines for each frame; and determining if a next scan line includes one of said predetermined intervals.

5. An improved method for generating an NTSC compatible color television signal having a main carrier signal, a color subcarrier signal 3,579,545 Hz above the main carrier signal, and an audio subcarrier signal 4.5 MHz above the main carrier signal, wherein the main carrier signal is modulated by a luminance signal, wherein the color subcarrier is modulated in quadrature with color difference signals, wherein the audio subcarrier signal is modulated by an audio signal, wherein the luminance and color difference signals provide 525 scan lines of picture frame information at a rate of 29.97 frames per second so that the color subcarrier has 227.5 cycles for each scan line, and wherein the improvement comprises incrementing a phase of the color subcarrier by a fixed increment at a number of predetermined intervals in each picture frame, wherein the number of predetermined intervals is greater than one, and wherein a sum of the fixed increments at said predetermined intervals is an odd-half-multiple of a color subcarrier cycle, thereby providing a constant spatial relationship between cycles of the color subcarrier and the scan lines for every frame, and wherein the number of predetermined intervals is $2^N$, wherein N is an integer, and wherein the fixed increment is $180°/2^N$.

6. The method of claim 5, wherein the number of predetermined intervals is 128, and wherein the fixed increment is 1.40625°.

7. The method of claim 6, wherein the predetermined intervals are at the beginning of every fourth scan line, starting with scan line 7 and skipping scan lines 263 and 271.

8. The method of claim 5, wherein the improvement further comprises:

counting scan lines for each frame; and determining if a next scan line includes one of said predetermined intervals.

9. A color video encoder comprising:

a subcarrier phase generator configured to provide a subcarrier phase;

a phase offset register coupled to add a phase offset to the subcarrier phase to provide an adjusted subcarrier phase;

a sinewave module coupled to receive the adjusted carrier phase and configured to convert the adjusted subcarrier phase to a subcarrier signal value; and an increment module configured to adjust the phase offset by an increment at a number of predetermined intervals in each picture frame, wherein the number of predetermined intervals is greater than one, and wherein a sum of the increments at said predetermined intervals is an odd-half-multiple of a color subcarrier cycle.

10. The color video encoder of claim 9, wherein the number of predetermined intervals is $2^N$, wherein N is an integer, and wherein the increment is $180°/2^N$.

11. The color video encoder of claim 9, wherein the number of predetermined intervals is 128, and wherein the increment is 1.40625°.

12. The color video encoder of claim 11, wherein the predetermined intervals are at the beginning of every fourth scan line, starting with scan line 7 and skipping scan lines 263 and 271.

13. The color video encoder of claim 9, further comprising:

counting scan lines for each frame; and determining if a next scan line includes one of said predetermined intervals.

14. The color video encoder of claim 9, wherein the subcarrier phase generator is a numerically controlled oscillator which comprises:

an adder coupled to receive a predetermined phase increment value and a current phase value, wherein the adder is configured to produce a subsequent phase value by adding the predetermined phase increment value to the current phase value; and a latch coupled to latch the subsequent phase value and provide the current phase value to the adder in response to a clock signal.

15. The color video encoder of claim 9, wherein the sinewave module comprises a look-up table.

16. The color video encoder of claim 9, wherein the sinewave module comprises a ROM.

17. A method for encoding a color television video signal, wherein the method comprises:

generating a color subcarrier;

incrementing a phase of the color subcarrier by an increment at a number of predetermined intervals in a picture frame, wherein the number of predetermined intervals is greater than one, and wherein a sum of the increments at the predetermined intervals is an odd half-multiple of a color subcarrier cycle;

counting scan lines for each frame; and determining if a next scan line includes one of said predetermined intervals.

18. The method of claim 17, wherein the number of predetermined intervals is 128, and wherein the increment is 1.40625°.

19. The method of claim 18, wherein the predetermined intervals are at the beginning of every fourth scan line, starting with scan line 7 and skipping scan lines 263 and 271.

20. An improved method for generating an NTSC compatible color television signal having a main carrier signal, a color subcarrier signal 3,579,545 Hz above the main carrier signal, and an audio subcarrier signal 4.5 MHz above the main carrier signal, wherein the main carrier signal is modulated by a luminance signal, wherein the color subcarrier is modulated in quadrature with color difference signals, wherein the audio subcarrier signal is modulated by an audio signal, wherein the luminance and color difference signals provide 525 scan lines of picture frame information at a rate of 29.97 frames per second so that the color subcarrier has 227.5 cycles for each scan line, and wherein the improvement comprises incrementing a phase of the color subcarrier by a fixed increment at a number of predetermined intervals in each picture frame, wherein the number of predetermined intervals is greater than one, and wherein a sum of the fixed increments at said predetermined intervals is an odd-half-multiple of a color subcarrier cycle, thereby providing a constant spatial relationship between cycles of the color subcarrier and the scan lines for every frame, wherein the improvement further includes counting scan lines for each frame, and determining if a next scan line includes one of said predetermined intervals.

21. The method of claim 20, wherein the number of predetermined intervals is 128, and wherein the fixed increment is 1.40625°.

22. The method of claim 21, wherein the predetermined intervals are at the beginning of every fourth scan line, starting with scan line 7 and skipping scan lines 263 and 271.

* * * * *